(12) United States Patent
Francois et al.

(10) Patent No.: US 9,140,498 B2
(45) Date of Patent: Sep. 22, 2015

(54) METHOD FOR MANUFACTURING A BUNDLE OF PLATES FOR A HEAT EXCHANGER

(75) Inventors: Gilles Francois, Saint-Savin (FR); Gabriel Merle, Chalon sur Saone (FR); Patrice Tochon, Uriage (FR); Franck Pra, Le Gua (FR); Claude Roussel, Echirolles (FR); Olivier Noel Baron, Echirolles (FR); Pierre-Xavier Bussonnet, Dracy-le-Fort (FR); Alain Bourgeon, Fontaines (FR)

(73) Assignees: ALFA LAVAL VICARB, Fontanil Cornillon; ALFA LAVAL PACKINOX, Paris (FR); Commissariat a l'energie atomique et aux energies alternatives, Paris (FR); AREVA NP, Courbevoie (FR)

( * ) Notice: Subject to any disclaimer, the term of this patent is extended or adjusted under 35 U.S.C. 154(b) by 795 days.

(21) Appl. No.: 13/321,099

(22) PCT Filed: May 17, 2010

(86) PCT No.: PCT/FR2010/050945
§ 371 (c)(1),
(2), (4) Date: Jan. 6, 2012

(87) PCT Pub. No.: WO2010/133791
PCT Pub. Date: Nov. 25, 2010

(65) Prior Publication Data
US 2012/0090822 A1    Apr. 19, 2012

(30) Foreign Application Priority Data
May 18, 2009    (FR) ...................................... 09 53264

(51) Int. Cl.
B23P 15/16    (2006.01)
B23D 53/04    (2006.01)
(Continued)

(52) U.S. Cl.
CPC .............. *F28D 9/0006* (2013.01); *B21D 53/04* (2013.01); *B23P 15/26* (2013.01); *F28D 9/0037* (2013.01);
(Continued)

(58) Field of Classification Search
CPC ................ F28D 9/0006; F28D 9/0037; F28D 2021/0054; F28F 3/02; F28F 3/04; F28F 2275/06; B23P 15/26; B21D 53/02; B21D 53/04; Y10T 29/49366; Y10T 29/49369; Y10T 29/4935
See application file for complete search history.

(56) References Cited

U.S. PATENT DOCUMENTS 3,476,179 A    11/1969    Meister et al.
5,228,515 A    7/1993    Tran
(Continued)

FOREIGN PATENT DOCUMENTS

FR    2 738 906 A1    3/1997
FR    2 880 106 A1    6/2006
FR    2 898 404 A1    9/2007

*Primary Examiner* — Sarang Afzali
(74) *Attorney, Agent, or Firm* — Davidson, Davidson & Kappel, LLC (57) ABSTRACT

A method is provided for manufacturing a bundle of plates for a heat exchanger made up of a stack of plates. The method includes reducing by machining the initial thickness of each plate by making at least at the periphery of the plate, at least one connecting shoe having a height greater than the thickness of the machined plate, forming on the central portion of the plate, corrugations, to be superposed pairwise on the plates, connecting the shoes in contact with the plates of each pair through a weld bead, superposing the pairs of plates and connecting the shoes in contact with the pairs of plates through a sealed weld bead by arranging a superposition of open or closed ends for alternate inflow or outflow of said fluid.

7 Claims, 6 Drawing Sheets

(51) Int. Cl.
    *F23D 9/00*      (2006.01)
    *F28D 3/02*      (2006.01)
    *F28D 3/04*      (2006.01)
    *F28D 9/00*      (2006.01)
    *B23P 15/26*     (2006.01)
    *B21D 53/04*     (2006.01)
    *F28F 3/02*      (2006.01)
    *F28F 3/04*      (2006.01)
    *F28D 21/00*     (2006.01)

(52) U.S. Cl.
    CPC ... *F28F 3/02* (2013.01); *F28F 3/04* (2013.01); *F28D 2021/0054* (2013.01); *F28F 2275/06* (2013.01); *Y10T 29/49366* (2015.01); *Y10T 29/49369* (2015.01)

(56) References Cited

U.S. PATENT DOCUMENTS

| | | | |
|---|---|---|---|
| 5,626,188 A * | 5/1997 | Dewar et al. | 165/166 |
| 5,699,856 A | 12/1997 | Merle | |
| 5,775,412 A * | 7/1998 | Montestruc et al. | 165/134.1 |
| 2003/0000687 A1 | 1/2003 | Mathur et al. | |
| 2009/0050295 A1 | 2/2009 | Francois | |

* cited by examiner

METHOD FOR MANUFACTURING A BUNDLE OF PLATES FOR A HEAT EXCHANGER

This application claims the benefit of French Patent Application FR 09 53264 filed May 18, 2009, which is hereby incorporated by reference herein.

The present invention relates to a method for manufacturing a compact bundle of plates for a heat exchanger operating at a high pressure and/or at a high temperature.

The invention also relates to a plate heat exchanger including at least one bundle of plates manufactured by such a method.

BACKGROUND

The bundles of plates for this type of heat exchanger generally include a stack of plates parallel to each other and which delimit between them circuits for circulating at least two independent fluids.

The circulation of the fluids between the plates may be of a convergent type, with crossed currents or with a counter current and each circuit is connected to admission and return collectors for the fluids.

The plates of the bundle of plates are equipped with different means with which the heat exchange co-efficient between the fluids may be increased.

For this, bundles of planar plates are known, between which are interposed fins made by folding thin metal sheets and assembled by brazing on the plates.

For high temperature applications, for example above 600° C., the use of a metal filler and of thin fins may pose problems.

Indeed, the metal filler having a lower melting point than the base metal, the temperature of use of the bundle of plates is limited and the use of a metal filler, the thermomechanical properties of which are different from those of the base material generate a weak point at the junction. Further, as the fins are very thin, for example, with a thickness of less than 0.5 mm, the enlargement of the grains during the brazing may prove to be redhibitory from a mechanical point of view.

A bundle of plates is also known, consisting of a stack of plates in which channels are engraved.

The engravement is achieved by chemical etching of the plates after positioning a protective mask on the portions not to be etched. Once they are etched, the plates are assembled by welding and notably by diffusion welding.

Making a bundle of plates with this technique is complex to apply and poses problems.

Chemical etching of the plates with nickel-based alloys is very difficult and manufacturers use mechanical machining techniques which are long and costly and do not leave much geometrical freedom for forming channels on the plates.

Moreover, for diffusion welding of nickel-based alloys, it is necessary to strongly heat the material. Indeed, whether this is an embodiment by hot isostatic compression or by axial uniform compression, the plates to be assembled are brought to a temperature above 1000° C. so that this heat treatment leads to enlargement of the grains, incompatible with the small thicknesses of the metal sheets.

The bundle of plates obtained by this technique has great stiffness because the plates are welded together in the whole exchange area and for this reason it is not very tolerant to thermal transients.

Another drawback of these two types of bundles of plates, lies in the fact that the welded or brazed junctions are made in the whole exchange area between the channels which are of small size which makes the inspection of these joints impossible, whether during manufacturing or during use of the bundle of plates.

A bundle of plates comprising a stack of metal heat exchange plates parallel to each other including edges with a smooth surface and a central portion provided with corrugations is also known for example from FR-A-2 738 906, for forming with the associated plates a dual circuit of two independent fluids and with a counter-current.

The assembling of the plates of this type of bundle of plates is achieved either by welding by means of a set of spacers positioned on the edges of the plates in order to obtain the required space between the plates, or by welding an added part acting as a spacer, itself welded on the longitudinal edge of each plate, and then welded together.

SUMMARY OF THE INVENTION

In the first case, the use of spacers imposes multiplication of the number of welds which are difficult to inspect after the assembly and also deposition of a weld wall on the side walls of the bundle of plates.

In the second case, the use of added parts also imposes multiplication of the number of welds and the welds located inside the bundle of plates can only be inspected during manufacturing. Further, the width of the welds may be a lower limit to the distance between the plates and therefore limit the compactness of the bundle of plates.

An object of the invention is to propose a compact bundle of plates for a high temperature heat exchanger which avoids the drawbacks mentioned earlier and with which the number of welds required for assembling the different plates together may be significantly reduced.

A method is provided for manufacturing a compact bundle of plates for a heat exchanger formed by a stack of plates delimiting between them at least two circuits for circulating two independent fluids and including a central heat exchange portion provided with corrugations, characterized in that:

the initial thickness of each plate is reduced by machining, by making at the periphery of the plate and/or of through-tubings, at least one connecting shoe with a height greater than the thickness of the plate after machining, corrugations are formed in the central portion of each plate, the plates are superposed pairwise by positioning the shoes of the plates over each other, the shoes in contact with the plates of each pair are connected through a sealed weld bead, the pairs of plates are superposed by positioning the shoes of the pairs of plates over each other, and the shoes in contact with the pairs of plates are connected through a sealed weld bead by arranging an alternating superposition of open or closed ends for inflow or outflow of said fluids.

According to other features of the invention:

the initial thickness of each plate is reduced by machining at least one face of the plate, the initial thickness of each plate is reduced by machining both faces of the plate, the corrugations are formed in the central portion of each plate by stamping or forming, after machining the thickness of the plates is comprised between 0.2 and 3 mm, after machining, the height of the shoes is determined by the amplitude of the corrugations and is preferably comprised between 0.5 and 5 mm, and after machining, the thickness of the shoes is comprised between 1 and 6 mm.

A plate heat exchanger is also provided including an enclosure resistant to the internal pressure, in which is placed at least one bundle of plates manufactured by the method as defined earlier.

BRIEF DESCRIPTION OF THE DRAWINGS

The invention will be better understood upon reading the description which follows, given as an example and made with reference to the appended drawings, wherein.

DETAILED DESCRIPTION

Figures 1, 1A:
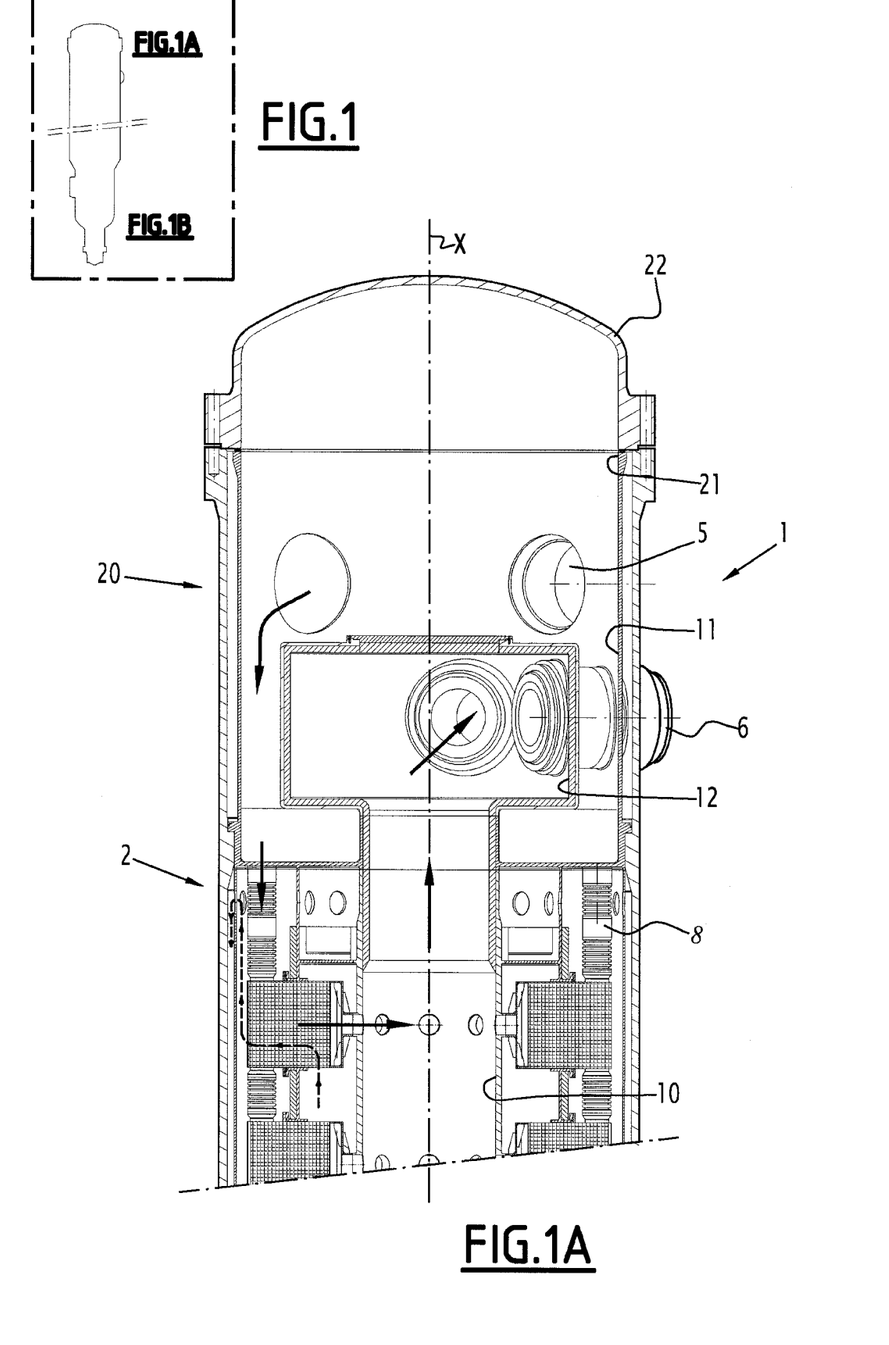
FIG. 1 consisting of FIGS. 1A and 1B is an axial sectional view of an exemplary heat exchanger including bundles of plates made by the method according to the invention.
Figure 1B:
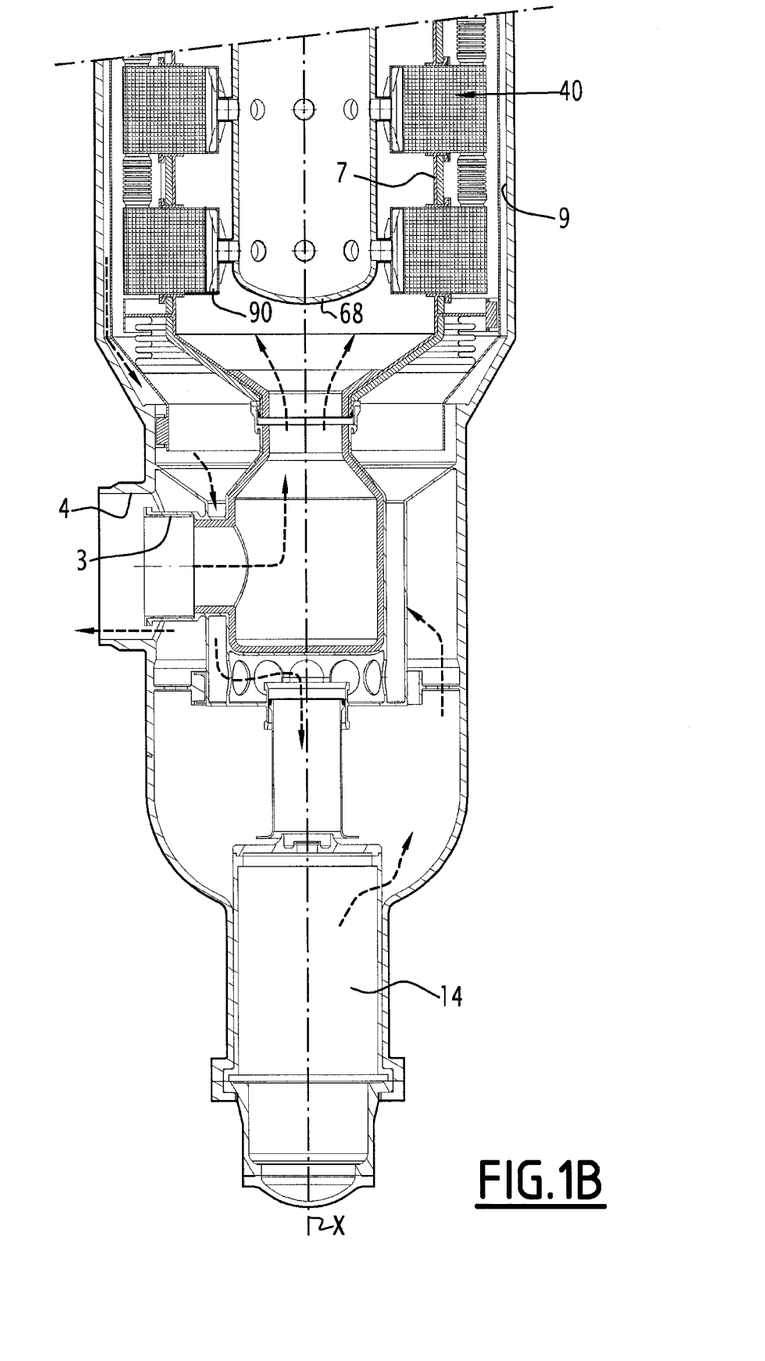

The heat exchanger 1 illustrated in FIG. 1 is given as an example in order to show a non-limiting embodiment for implantation of bundles of plates manufactured by the manufacturing method according to the invention.

The heat exchanger 1 is intended to be used in a nuclear reactor at a high temperature, generally above 600° C., in order to achieve heat exchange between a first fluid and a second fluid.

The first fluid is the primary fluid of the nuclear reactor and circulates in a closed loop in the latter. It crosses the core of the nuclear reactor and then crosses the heat exchanger 1 and finally returns to the inlet of the core. The primary fluid is heated in the core of the reactor and flows out of the latter for example at a temperature of about 850° C. It yields part of its heat to the secondary fluid in the heat exchanger 1 and flows out from the latter for example at a temperature of about 400° C.

The second fluid is the secondary fluid of the nuclear reactor and circulates in a closed loop in the latter, it crosses the heat exchanger 1, and then passes into a gas turbine for driving an electric generator and returns to the inlet of the heat exchanger 1. The secondary fluid enters this heat exchanger 1, for example at a temperature of about 350° C. and flows out therefrom, for example at a temperature of 800° C.

The heat ex changer 1 comprises:
- an outer enclosure 2 having a central substantially vertical axis X, provided with an inlet 3 and an outlet 4 for the primary fluid, with four inlets 5 and four outlets 6 for the secondary fluid,
- eight bundles of heat exchange plates 40 positioned in the enclosure 2, in which heat exchanges between the primary and secondary fluids are achieved,
- a ring-shaped collector 7 for feeding the bundles of plates 40 with primary fluid,
- collectors 8 for feeding the bundles of plates 40 with secondary fluid,
- a ring-shaped collector 9 for collecting and discharging the primary fluid flowing out of the bundles of plates 40,
- a central collector 10 for collecting and discharging the secondary fluid flowing out of the bundles of plates 40,
- an inlet chamber 11 distributing the secondary fluid into the collectors 8, and an outlet chamber 12 distributing the secondary fluid flowing out of the secondary discharge collector 10 to the outlets 6,
- lower internal pieces of equipment 11 channeling the primary fluid between the collectors 7 and 9 on the one hand and the inlet 3 and the outlet 4 for the primary fluid, on the other hand, and
- a fan 14 for circulating the primary fluid, attached in the enclosure 2.

The enclosure 2 comprises a tank 20 inside of which are positioned the bundles of plates 40 and the collectors 7, 8, 9 and 10, having towards the top an aperture 21 and a removable lid 22 for sealing the aperture 21 of the tank 20. The inlets 5 for the secondary fluid are made at the top of the tank 20 and are regularly distributed over a same circumference of the latter.

The outlets for the secondary fluid 6 are made at the top of the tank 20, slightly below the inlets 5 and are regularly distributed over a same circumference of this tank.

The tank 20 comprises in a lower portion a single tap through which the inlet 3 and the outlet 4 are made for the primary fluid. The inlet 3 and the outlet 4 are coaxial and the outlet 4 surrounds the inlet 3.

The tank 20 is closed towards the bottom by a convex bottom which has a round central aperture centered on the axis X, in which the fan 14 is attached.

Figure 2:
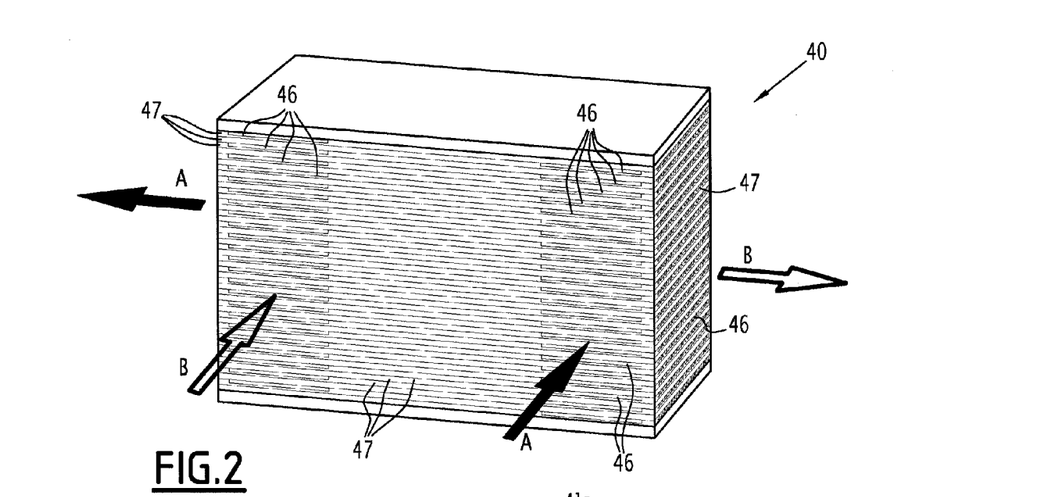
FIG. 2 is a schematic perspective view of a bundle of plates of the heat exchanger of FIG. 1.
Figures 3, 3B:
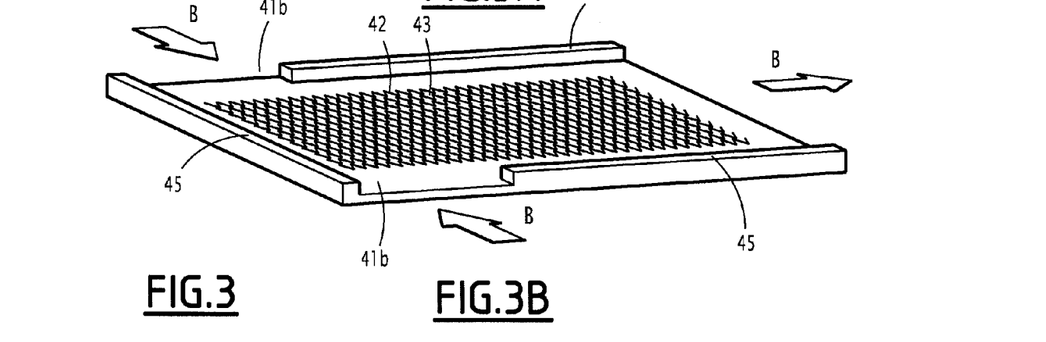
FIG. 3 is a schematic view of a pair of plates of the bundle of plates, FIG. 4 consisting of FIGS. 4A-4D is a schematic cross-sectional view of a plate of the bundle of plates and showing the different steps of a first embodiment of the manufacturing method according to the invention, FIG. 5 consisting of FIGS. 5A-5D is a cross-sectional diagram of a plate of the bundle of plates and showing the different sections of a second embodiment of the manufacturing method according to the invention.
Figure 3A:
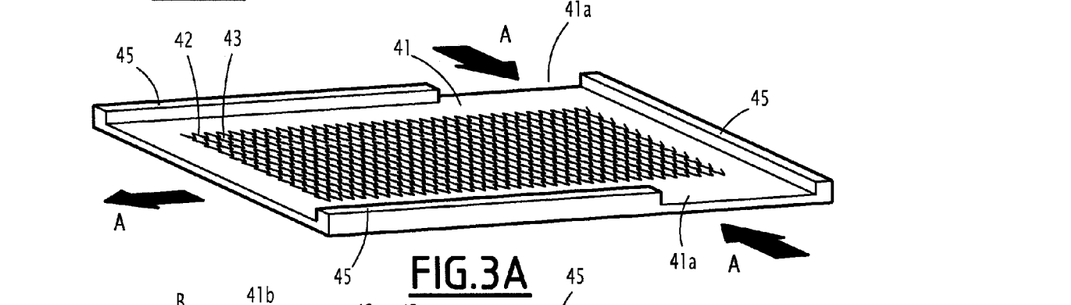

As this is seen in FIGS. 2 and 3, the bundles of plates 40 are formed by a stack of plates 41 delimiting between them two circuits for circulating two fluids, the first fluid A indicated by the solid arrows in FIG. 2 and the second fluid B indicated by the hollowed arrows in this figure. The first and second fluids alternately circulate in one plate out of two of the stack.

Each plate 41 includes a central heat exchange portion provided with corrugations 42 which determine between them channels 43 promoting heat exchange between the fluids.

Generally, the corrugations 42 are formed by patterns obtained by deforming the plate, such as for example, pads, ribs, inserts, or other patterns.

In order to determine the open 46 or closed 47 ends of the channels 43 in which circulate the first and second fluids, alternately in one plate 41 out of two of the stack forming the bundle of plates 40, each plate 41 includes, protruding on its respectively longitudinal 41a and/or transverse 41b edges, a continuous shoe 45 or several discontinuous shoes 45. The arrangement of the shoes 45 on the longitudinal 41a and/or transverse 41b edges depends on the direction of flow of the fluids between the plates 41 of the bundle of plates 40 and also on the arrangement of the fluid inflow and outflow collectors.

The arrangement of the shoes 45 on the longitudinal 41a and and/or transverse 41b edges illustrated in FIG. 3 is an exemplary embodiment, other arrangements may of course be contemplated.

Now referring to FIGS. 4 and 5, two embodiments of the method for manufacturing the bundle of plates 40 will be described.

As shown in FIG. 4A, initially the plate 41 is planar and has constant thickness.

The first step of the method consists of reducing preferably by mechanical machining, the initial thickness of a plate 30 in order to obtain the plate 41 by making at the periphery of this plate, the shoes 45 on the longitudinal 41a and/or transverse 41b edges of said plate 41. Mechanical machining for example by milling is carried out on at least one face of the plate 41.

Figure 4:
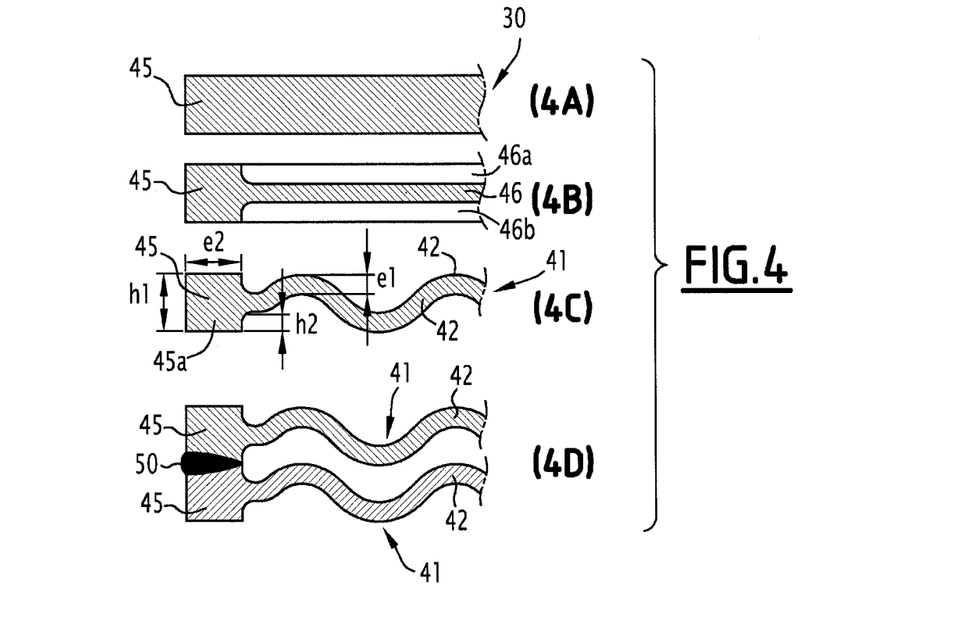

According to a first embodiment illustrated in FIG. 4, the reduction in the thickness of the plate 30 is achieved by mechanically machining both faces of the plate 30 so as to retain a central area 46 after having removed both outer areas 46a and 46b, as shown in FIG. 4B. The non-hatched areas represent the removed material.

Next, the second step of the method consists of forming the corrugations 42 in the central portion of each plate 41.

Once the plates 41 are thereby made, the plates 41 are superposed pairwise by positioning the shoes 45 above each other and the shoes 45 in contact with the plates 41 of each pair are connected through a sealed weld bead 50 as shown in FIG. 4D.

Next, the pairs of plates 41 are superposed by positioning the shoes 45 of the pairs of plates 41 over each other and the shoes 45 in contact are connected together through a sealed weld bead 50.

Figure 5:
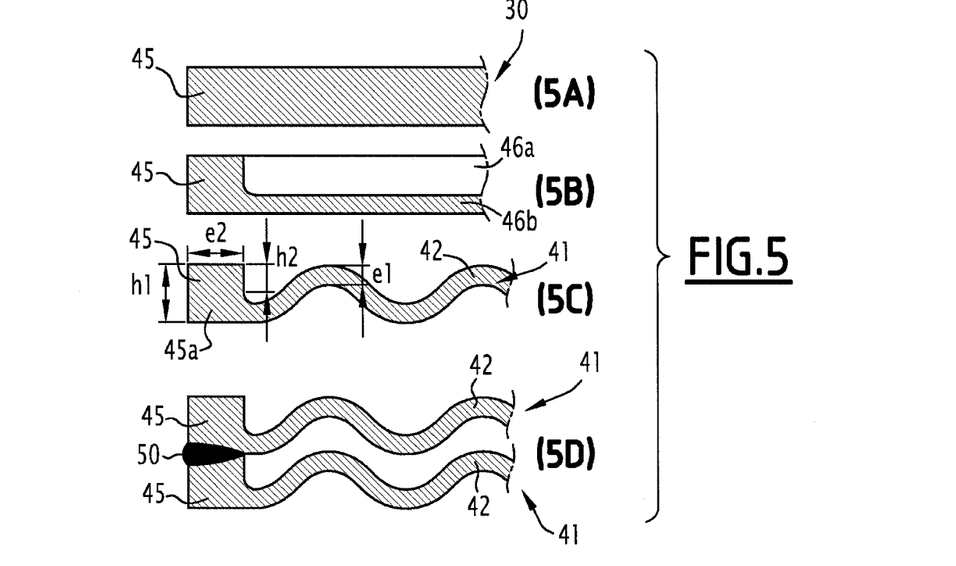

According to a second embodiment illustrated in FIG. 5, in order to obtain the plate 41, the initial thickness of a plate 30 is reduced by mechanically machining a single face of the plate, as shown in FIG. 5A. The non-hatched area represents the removed material.

In this case, a single area 46a is removed and the remaining area 46 is located on an edge of the shoe 45 whereas in the previous embodiment, the shoe 45 extends on either side of the remaining area 46. In this second embodiment, the following steps of the method are identical with the steps of the previous embodiment and consist of forming corrugations 42 on the central portion of the plate 41, and then superposing the plates 41 pairwise and connecting the shoes 45 in contact with the plates of each pair through a sealed weld bead 50.

The pairs of plates are then superposed by positioning the shoes 45 of the pairs of plates 41 over each other and the shoes 45 in contact with the pairs of plates 41 are connected through a sealed weld bead 50.

The machining of each plate 41 is for example machining by milling and the corrugations 42 in the central portion of each plate 41 are made for example by stamping or forming.

As an example, after machining, the thickness e1 of the plate 41 is comprised between 0.2 and 3 mm, the height h1 of the shoes is comprised between 0.5 and 5 mm, the thickness e2 of the shoes 45 is comprised between 2 and 4 mm. The height h2 of the heels 45a of the shoes 45 located on each side of the plate 41, (FIG. 4C) or on a single side of the plate 41 (FIG. 5C), is comprised between 0.2 and 3 mm.

Generally, the height of the shoes is determined by the amplitude of the corrugations.

The heights of the different shoes 45 are not necessarily equal depending on whether they are on the cold side or on the hot side of the bundle of plates or whether they are located on the cold side of the collectors or on the hot side of the collectors for inflow or outflow of both fluids.

Preferably, the plates 41 are assembled and welded two by two, and the thereby formed pairs of plates having identical dimensions are then assembled and welded in order to form the final stack. With this method it is possible to avoid having to take into account the problem of shrinkage which occurs during welding. Indeed, if the stack is made by adding plates one by one to the stack welded beforehand, the new plate to be welded does not have the same dimensions as the already welded plates because of shrinkage due to the welding.

The collectors, for the inflow and outflow of the fluids associated with the bundle of plates 40 may be directly integrated into the bundle of plates 40 or they may be of any type with an added shape and welded on the corresponding bundle of plates 40.

In FIGS. 6-9, another example of a bundle of plates 40 is illustrated, for which each plate 41 is made by the method according to the invention.

In this exemplary embodiment, the bundle of the plates is of the type with through-tubings for forming collectors.

In this case, the plates of the bundle of plates 40 are associated two by two, an upper plate 61 and a lower plate 62.

Also in this case, both faces of each plate 61 and 62 are mechanically machined in order to remove a portion of the material and to retain a determined thickness portion corresponding to the thickness of each plate 61 or 62 to be obtained. One or more shoes 63 are made on the longitudinal and/or transverse edges of the plate 61 and one or more shoes 64 are also made on the longitudinal and/or transverse edges of the plate 62. The non-hatched areas correspond to the removed material. In this exemplary embodiment, the shoes 63 and 64 only extend on one side of the corresponding plate, respectively 61 and 62, below the plate 61 for the shoes 63 and above the plate 62 for the shoes 64.

Figure 6:
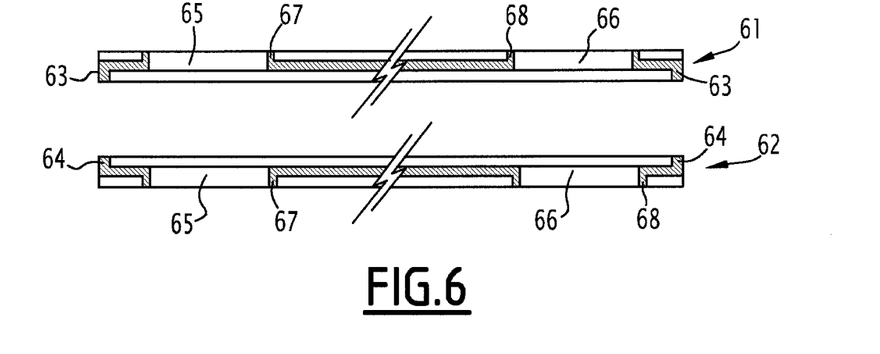
FIGS. 6-9 are schematic cross-sectional views showing the different steps of the method for manufacturing an alternative of the bundle of plates.

An inlet orifice 65 for the second fluid B is pierced in each of the plates 61 and 62 and an outlet orifice 66 for this second fluid B is also pierced in the plates 61 and 62, as illustrated in FIG. 6. These orifices 65 and 66 are respectively bordered by a shoe, 67 and 68.

The inlet orifices 65 and the outlet orifices 66 when they are superposed, form the through-tubings.

Figure 7:
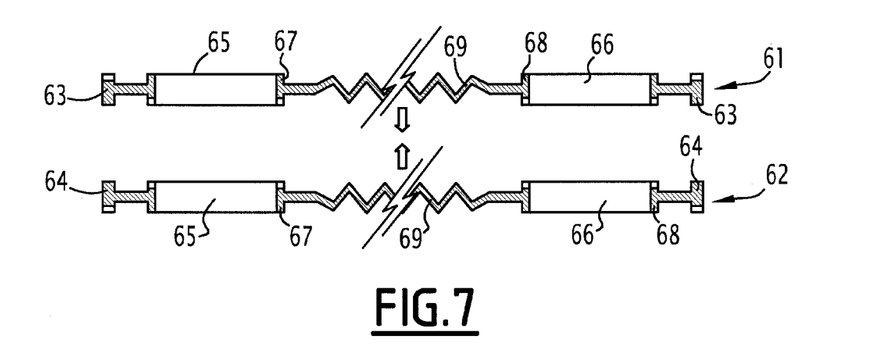
Figure 8:
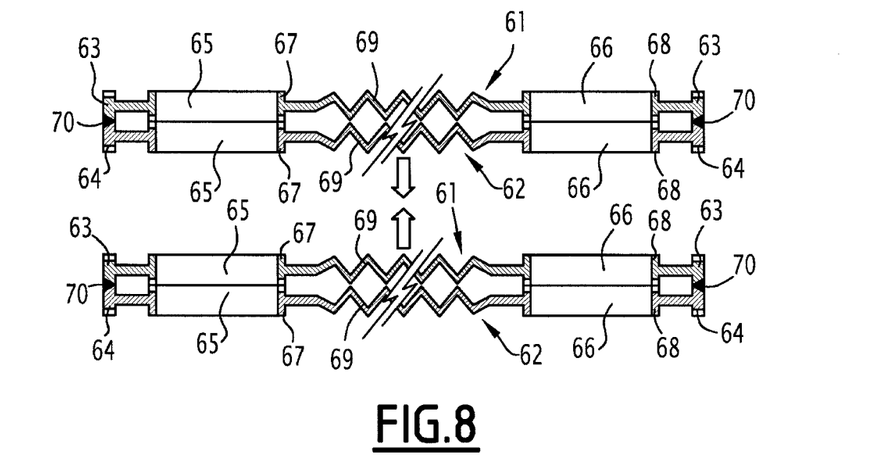

Next, corrugations 69 are formed on the central portion of each plate 61 and 62 and these plates are superposed pairwise. The shoes 63 and 64 which are in contact with each other are connected through a sealed weld bead 70.

The thereby formed pairs of plates 61 and 62 are superposed and the shoes 63 and 64 in contact with the superposed pair of plates 61 and 62 are also connected through a sealed weld bead 70.

Figure 9:
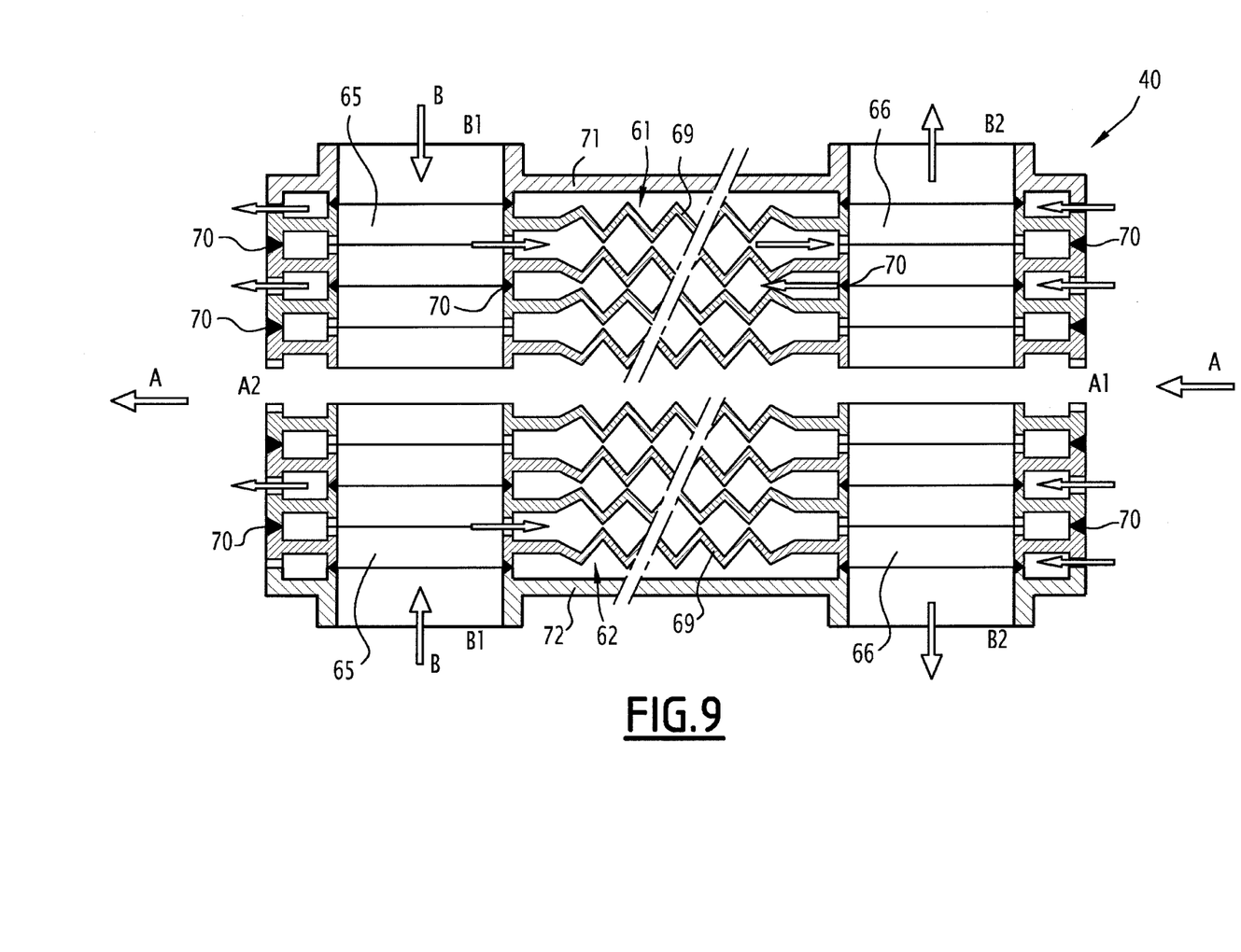

The shoes 67 and 68 in contact around each orifice 65 and 66 are also welded through a sealed weld bead 70, as illustrated in FIG. 9. The thereby formed stack of plates 61 and 62 is mounted between two thick and opposite plates, 71 and 72 respectively, extending parallel to the pairs of plates 61 and 62.

In the exemplary embodiment illustrated in FIG. 9, the stack of the plates 61 and 62 arranges, at a side face of the bundle of plates 40, an area A1 for inflow of the first fluid A and on the opposite face, an area A2 for outflow of this first fluid A after its passing into the corresponding circuit of the bundle of plates 40. The fluid A circulates in channels made between two adjacent plates 61 and 62 of one pair of plates out of two. The inflow area A1 is connected to a collector, for admission of the first fluid A and the outflow area A2 is connected to a collector, for outflow of this second fluid A.

The orifices 65 made in the plates 61 and 62 determine two opposite admission areas B1 for the second fluid B and the orifices 66 made in the plates 61 and 62 determine two outflow areas B2 for this second fluid B after its passing in the corresponding circuit of the bundle of plates 40. This second fluid B enters through the orifices 65 and circulates in the channels made between the plates 61 and 62, in one pair of plates out of two, as a counter-current to the first fluid A. Each area B1 is connected to a collector, for inflow of the second fluid B and each outlet area B2 is connected to a collector, for outflow of this second fluid B after its passing into the bundle of plates 40.

The fluids A and B alternately circulate between two plates out of two of the bundle of plates 40.

Other arrangements may of course be contemplated.

As an example, the materials making up the plates are nickel-based steels or stainless steels. The welds are made by the TIG method or a laser or laser beam method.

With the manufacturing method according to the invention, it is possible to obtain by machining the plates, a greater dimensional accuracy than that of bundles of plates including added parts or with spacers.

With assembling by welding, it is possible to suppress any risk of the microstructure of the material being affected outside the welded area and the thermally affected area.

Moreover, the welds are exclusively placed at the periphery of the bundle of plates or in the tubings for circulating the secondary fluid B in the exemplary embodiment of FIG. 9, whence increased flexibility towards thermal transients and facilitation of possible inspection of the whole of the welds because of access from the outside for the welds located at the periphery and access through the tubings of the secondary fluid in the example of FIG. 9.

The method according to the invention gives the possibility of suppressing the laying of a weld wall as well as the use of added parts. This arrangement therefore reduces the number of welds consequently increasing the reliability of the apparatus and allowing a good quality weld to be achieved.

Finally, the method according to the invention allows manufacturing of bundles of plates with a small distance separating each plate, of less than 3 mm.

The invention claimed is:

1. A method for making a compact bundle of plates for a heat exchanger formed with a stack of plates delimiting between them at least two circuits for circulating two independent fluids, and including a central heat exchange portion provided with corrugations, the method comprising:
    machining each plate to reduce an initial thickness of each plate to form at at least one of a periphery of each plate and through-tubings at least one connecting shoe with a height greater than a thickness of each plate after machining;
    forming corrugations in a central portion of each machined plate;
    superposing the corrugated plates pairwise by positioning the shoes of the corrugated plates over and in contact with each other;
    connecting the contacting superposed shoes of the corrugated plates of each pair together through a weld bead;
    superposing the welded pairs of corrugated plates by positioning the shoes of the welded pairs of corrugated plates over and in contact with each other; and
    connecting the contacting superposed shoes of the welded pairs of corrugated plates through a sealed weld bead by arranging an alternating superposition of open or closed ends for inflow or outflow of said fluids.

2. The method recited in claim 1 wherein after machining, the height of the shoes is determined by an amplitude of the corrugations, and preferably comprised between 0.5 and 5 mm.

3. The method recited in claim 2 wherein after machining, the thickness of the shoes is comprised between 1 and 4 mm.

4. The method recited in claim 1 wherein the initial thickness of each plate is reduced by machining of at least one face of each plate.

5. The method recited in claim 1 wherein the initial thickness of each plate is reduced by machining both faces of each plate.

6. The method recited in claim 1 wherein the corrugations are formed in the central portion of each plate by stamping or by forming.

7. The method recited in claim 1 wherein after machining, the thickness of the plates is comprised between 0.2 and 6 mm.

* * * * *